United States Patent
Platus et al.

[11] 3,735,952
[45] May 29, 1973

[54] ENERGY ABSORBING SHOCK ISOLATION STABILIZING ARRANGEMENT

[75] Inventors: David L. Platus; David A. Lee; Gernot Harold Klein, all of Los Angeles, Calif.

[73] Assignee: Mechanics Research Inc., Los Angeles, Calif.

[22] Filed: Feb. 13, 1970

[21] Appl. No.: 11,284

[52] U.S. Cl. ............248/358 R, 105/392.5, 188/1 C, 206/46 FR, 206/46 M, 217/54, 217/55, 248/18, 267/136, 267/150, 312/352
[51] Int. Cl. ......F16d 63/00, F16f 13/00, F16f 15/04
[58] Field of Search...............105/392.5; 188/1 C; 206/46 FR, 46 M; 217/54, 55; 248/17, 18, 358; 267/121, 136, 150; 312/352

[56] References Cited

UNITED STATES PATENTS

| | | | |
|---|---|---|---|
| 3,131,903 | 5/1964 | Quick | 267/150 X |
| 3,441,238 | 4/1969 | Flannelly | 248/358 AA X |
| 3,428,279 | 2/1969 | Johnson | 248/358 AA X |
| 3,145,012 | 8/1964 | Kfoury | 248/358 AA |
| 3,368,824 | 2/1968 | Julien | 267/121 X |
| 3,459,395 | 8/1969 | Scotto | 248/358 AA X |
| 2,615,707 | 10/1952 | Rowe et al. | 217/54 X |
| 3,348,796 | 10/1967 | Baratoff et al. | 267/121 X |
| 3,426,869 | 2/1969 | Platus et al. | 188/1 C |
| 3,435,919 | 4/1969 | Gularte et al. | 188/1 C |
| 3,445,080 | 5/1969 | Flannelly | 267/136 X |

*Primary Examiner*—Gerald M. Forlenza
*Assistant Examiner*—Howard Beltran
*Attorney*—Finkelstein and Mueth

[57] ABSTRACT

An energy absorbing shock isolation stabilizing arrangement for providing shock and vibration isolation of an object within a supporting enclosure. The arrangement provided is passive and has energy absorption means for absorbing energy during relative motion of the object within the enclosure from a base position to displaced positions at a comparatively high energy absorption rate that preferably is constant and substantially independent of the magnitude of the relative velocity. Restoring means comprising return means also are included for returning the object from the displaced position to the base position and a comparatively low level of energy is absorbed during this return. Such shock isolation can be provided for each degree of freedom of the object within the enclosure.

33 Claims, 21 Drawing Figures

INVENTORS
DAVID L. PLATUS
DAVID A. LEE
GERNOT HAROLD KLEIN
BY
Finkelstein & Mueth
ATTORNEYS Patented May 29, 1973

INVENTORS
DAVID L. PLATUS
DAVID A. LEE
GERNOT HAROLD KLEIN
BY
Finkelstein & Mueth
ATTORNEYS Patented May 29, 1973
3,735,952
5 Sheets-Sheet 3
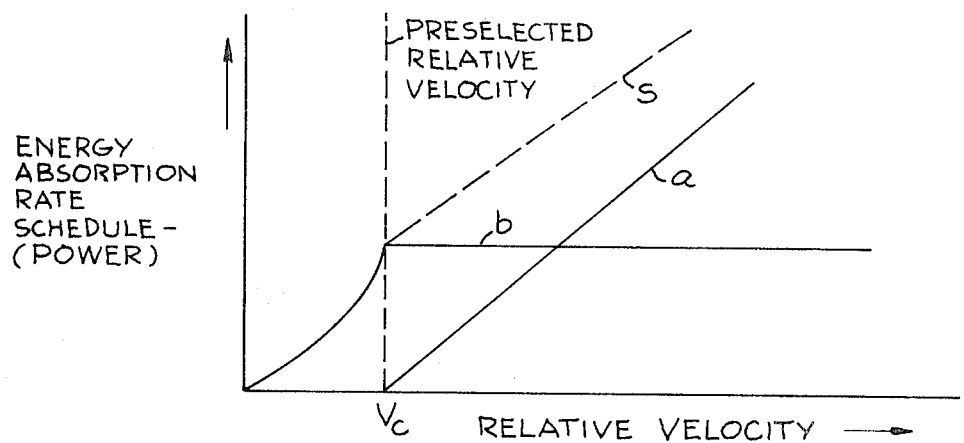
Fig. 9
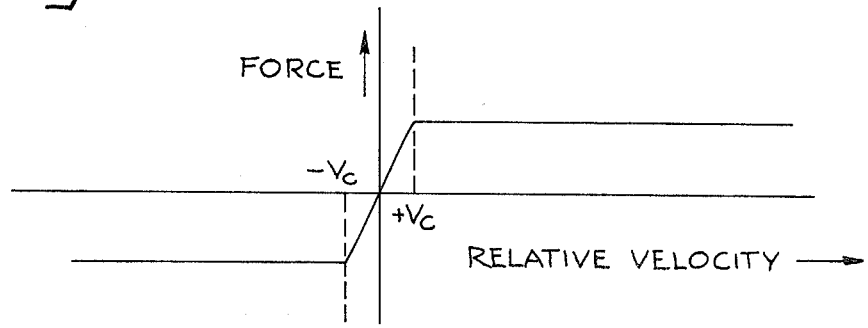
Fig. 9A
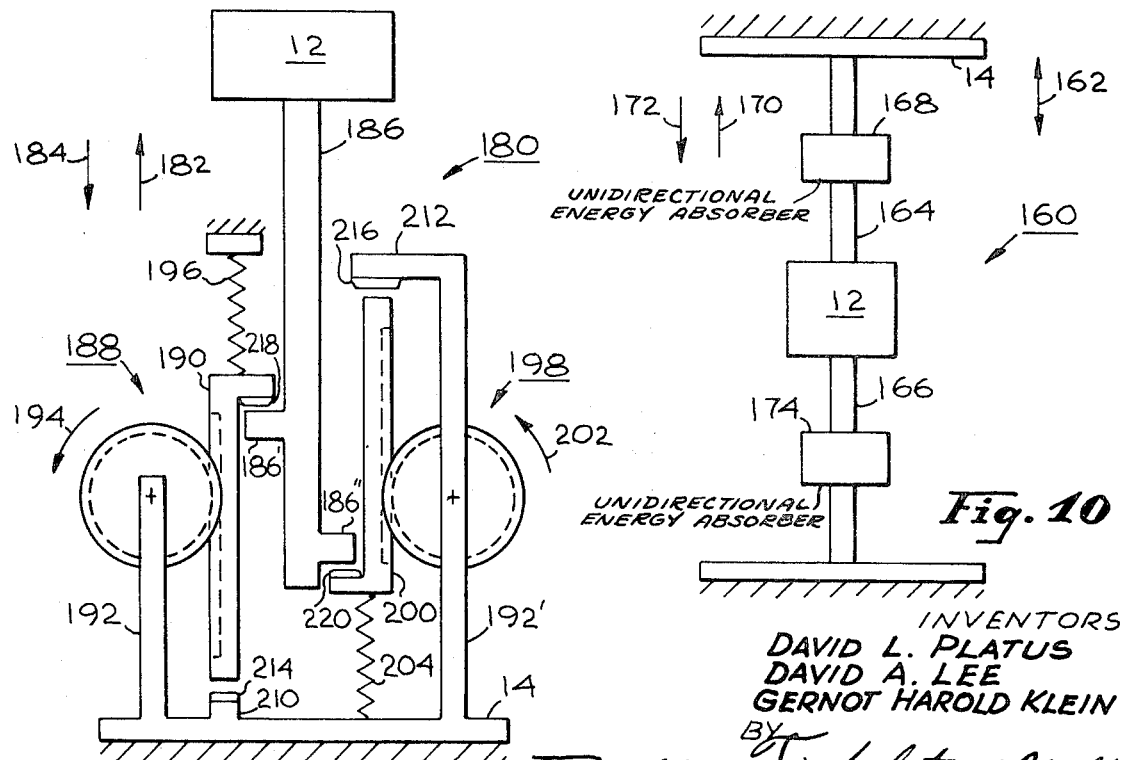
Fig. 11
Fig. 10
INVENTORS
DAVID L. PLATUS
DAVID A. LEE
GERNOT HAROLD KLEIN
BY Finkelstein & Mueth
ATTORNEYS

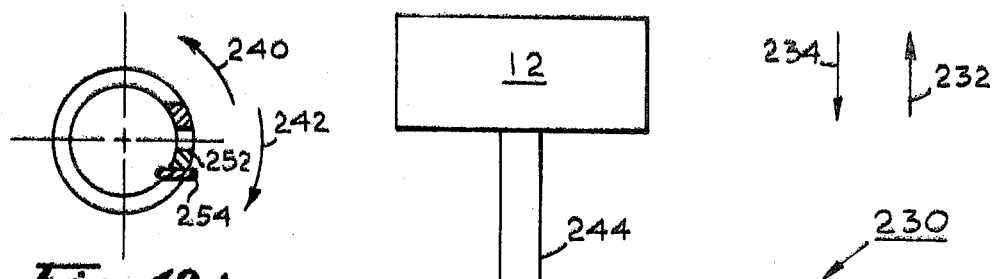
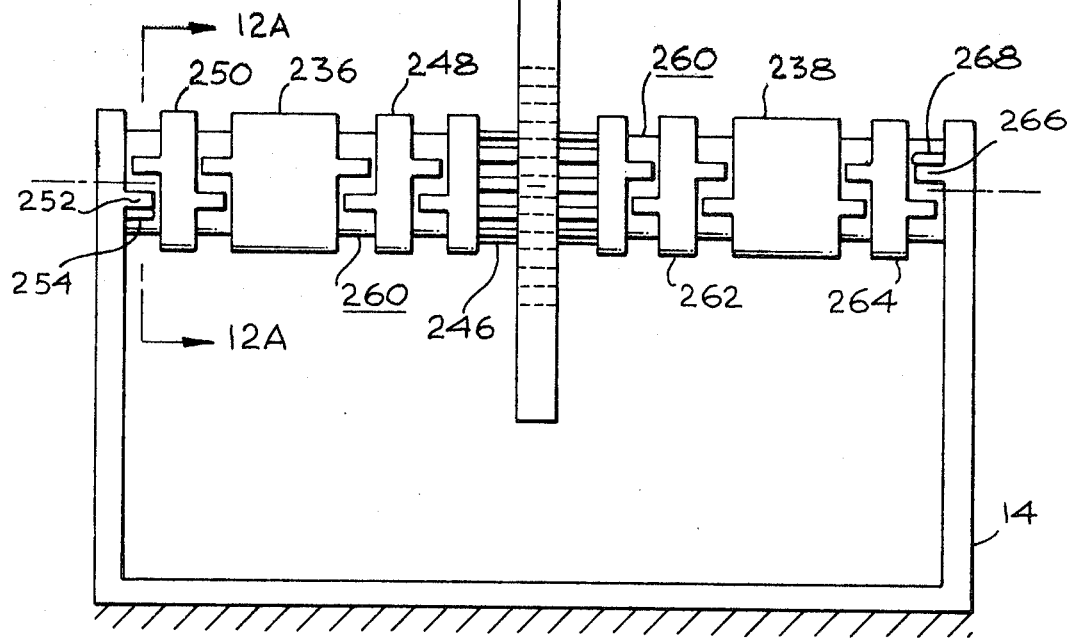
Fig. 12A
Fig. 12
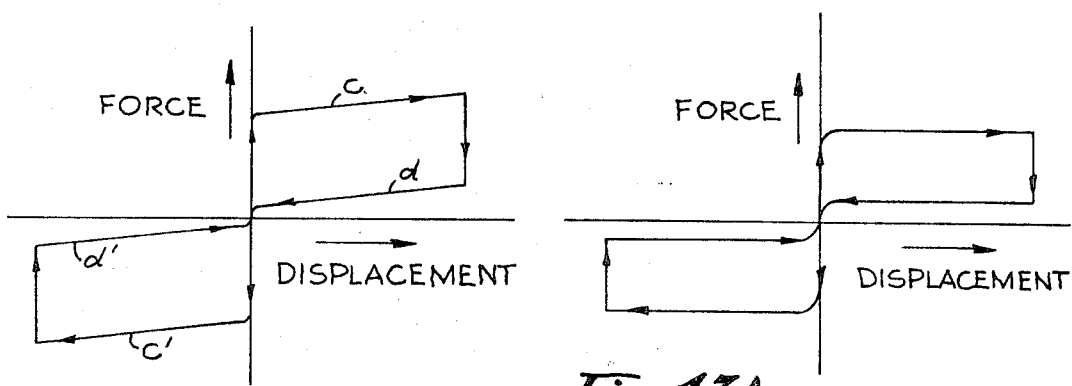
Fig. 13
Fig. 13A
INVENTORS
DAVID L. PLATUS
DAVID A. LEE
GERNOT HAROLD KLEIN
BY
Finkelstein & Mueth
ATTORNEYS

INVENTORS
DAVID L. PLATUS
DAVID A. LEE
GERNOT HAROLD KLEIN
BY
ATTORNEYS

ENERGY ABSORBING SHOCK ISOLATION STABILIZING ARRANGEMENT

BACKGROUND OF THE INVENTION

1. Field of the Invention

This invention relates to the shock isolation art and more particularly to a passive energy absorbing shock and vibration isolator arrangement.

2. Description of the Prior Art

In many applications it is desired to provide shock isolation and/or vibration isolation between an object and its supporting enclosure. Such applications include, of course, situations where it is desired to isolate an object from shock and/or vibration transmitted to it from the supporting enclosure as well as isolating the supporting enclosure from shock and/or vibration generated within the object. The former class includes the mounting of equipment on ships, track and wheel vehicles, aircraft, spacecraft and the like; objects packaged for isolation against severe shock and vibration environment during transport such as that produced by trucks, airplanes, ships or railroad cars; objects isolated within moveable packages to be protected from jars and dropping of the entire supporting environment and the like. Additionally, such applications also include objects isolated against severe shock and vibration due to earthquake and/or weapons effects such as buildings and other structures, hard underground missile silos and support facilities, and the like.

The latter class includes the mounting of equipment such as drop hammers and heavy reciprocating machinery in order to reduce the shock and/or vibration transmitted from forces within the machinery to the surrounding supporting environment such as the floor of the building in which it is supported. Additionally, it may also include shock and/or vibration isolation of artillery or other weapons on the weapons' supports.

It will be appreciated that shock and/or vibration may be transmitted in a plurality of degrees of freedom. For convenience, the present invention is described herein as providing shock isolation in a single degree of freedom. Those skilled in the art, of course, can easily utilize the teachings provided herein to provide shock isolation for an object in as many degrees of freedom as desired. Additionally, the invention is described as utilized in shock isolating an object from shock and/or vibration generated in the supporting environment, that is, the first class abovementioned. Those skilled in the art can easily determine from the teachings herein the necessary modifications to provide the shock isolation and/or vibration isolation according to the principles of this invention for the second class.

In such shock isolation arrangements heretofore utilized the structures have generally been classified as either active systems having energy sources and sensors, or passive systems. The complications associated with active shock isolation systems have often made them impractical for many of the abovementioned applications.

Additionally, it has been found that many passive isolator arrangements have been of the type wherein after a subjection to a shock from the supporting environment there was no predicting exactly where the object is relative to the supporting environment. Such passive isolators, then, required a means for disengaging or using an external energy source to restore the object and isolator to its initial position. After such return the shock isolator may then be reengaged. Such systems, of course, required mechanisms to detect the displacement of the object, disengage the isolator, return the object to the base or initial position, and reengage the shock isolator. This left the object vulnerable to shock during such repositioning when the isolator was disengaged as well as requiring comparably complex mechanisms.

It will be appreciated that, in general, shock isolation arrangements should provide shock isolation so that the protected object supported within an enclosure is subjected to acceleration forces less than a given maximum allowable acceleration force. Additionally, the maximum displacement of the object should be minimized. The maximum allowable displacement of the object within the enclosure is generally termed the rattle space and for any anticipated shock the shock isolator arrangement must provide that the displacement of the object does not exceed the allowable rattle space.

Thus, energy absorption is a technique for providing the above criteria. Shock isolators utilized in the past have often utilized energy storing members, such as springs as well as energy absorbing members and various combinations therebetween. Energy absorbers have been both viscous dampers as well as cyclic strain energy absorbing devices employing ductile metals, Coulomb or dry friction dampers. It has been found that the Coulomb or dry friction dampers and the cyclic strain energy absorbing devices employing ductile metals as well as cyclic straining of elastomeric materials has provided energy absorption in a constant force level substantially independent of the relative velocity between the object to be shock isolated and the supporting structural environment.

In general, passive shock isolation arrangements have predetermined characteristics that are independent of motions of the supporting enclosure and the object to be shock isolated. As such, these predetermined characteristics establish a force displacement and/or force velocity relationship. Such systems may include those incorporating metal springs, hydraulic and pneumatic devices, elastomeric, dry friction and metal cyclic strain dampers, and various combinations thereof.

Active shock isolator arrangements, on the other hand, are ones for which the characteristics are dependent upon the characteristics of the motion of the enclosure. That is, the force displacement and/or force velocity relationship are not independent of the motions of the supporting structural environment and the object to be shock isolated. The characteristics are changed by some external means which, for example, may be through the addition or removal of energy from the system or by connecting or disconnecting members and the like based upon either preprogramming or through the use of a sensor system that detects relative velocity, accelerations, forces, displacements, and the like and actively puts energy into the system or removes energy from the system to provide the shock isolation. However, as noted above, passive shock isolation systems are usually preferred since they are less costly and less complex.

Constant force energy absorbers have been utilized in the past for energy absorbing applications and have inherent characteristics making them useful for shock isolation and vibration isolation of an object supported within an enclosure wherein there is a fixed rattle space. Such constant force energy absorbers may be cyclic strain energy absorbers, incorporating cyclic straining of elastomers or ductile metals, friction energy absorbers, liquid spring shocks and the like.

Ideally, then, the shock isolation arrangement should absorb energy at a substantially constant force for displacements of the object relative to the enclosure in each direction for which shock isolation and/or vibration isolation is desired. Additionally, the shock isolation arrangement should restore the object to be shock isolated after each displacement relative to the enclosure back to its base position within the enclosure. Such an ideal shock isolator arrangement should also be capable of repeated cycles of operation to allow for multiple impact capability and should never leave the object in an unprotected condition.

To the extent that shock isolator arrangements meet the above idealized criteria they approach the ideal shock isolation arrangement. However, in general, the above characteristics have not been completely achieved in prior art shock isolation arrangements and therefore there has long been a need for shock isolation and/or vibration isolation arrangements in which the above criteria are met or more closely approached than has heretofore been available.

SUMMARY OF THE INVENTION

Accordingly, it is an object of the invention herein to provide an improved shock isolation arrangement for shock isolation of an object from its supporting environmental enclosure.

It is another object of the invention herein to provide a shock isolation arrangement incorporating energy absorption in which the object to be shock isolated is returned to its initial position after each displacement.

It is yet another object of the invention herein to provide a passive shock isolation arrangement in which the shock isolation arrangement is always engaged to provide shock isolation between the object to be shock isolated and its enclosure.

The above, and other objects of the invention herein are achieved, in a preferred embodiment thereof, by providing the object to be shock isolated positioned within an enclosure comprising the structural supporting environment for the object. A shock isolation means generally comprising an energy absorbing, or energy absorption means which is operatively connected between the object and the enclosure.

An engagement means is connected to the object and to the energy absorption means. The energy absorption means, in this embodiment, comprises a first energy absorber and a second energy absorber. The energy absorption means has in this embodiment has both a first and a second predetermined energy absorption rate schedule for the condition of the object to be shock isolated having relative movement from its base position to a first or second displaced position in a first direction or second direction, respectively, in the preselected degree of freedom for which the object is to be shock isolated. The first predetermined energy absorption rate schedule corresponds to the energy absorption characteristics of the first energy absorber and the second predetermined energy absorption rate schedule corresponds to the energy absorption rate schedule of the second energy absorber. The second energy absorption rate schedule is selected to be less than the first energy absorption rate schedule. The energy absorption means also absorbs energy at a third predetermined energy absorption rate schedule for the condition of return of the object to be shock isolated to its initial or base position after each displacement. In preferred embodiments of the invention the third energy absorption rate schedule is substantially less than the first energy absorption rate schedule.

The shock isolation means also includes the return means for returning the object from the first or second displaced position to the base position after such displacement. As noted, during the return the energy absorption means absorbs energy at the third predetermined energy absorption rate schedule. The third predetermined rate schedule is comparatively small and substantially less than the first predetermined energy absorption rate schedule and in certain preferred embodiments of the present invention, the third predetermined energy absorption rate schedule is the same as the second energy absorption rate schedule. At all times the energy absorption means is fully engaged and ready to absorb energy and the object to be shock isolated is never left unguarded.

In a preferred embodiment of the invention the energy absorption means comprises the first energy absorber comprising a substantially constant force energy absorber, such as a cyclic strain energy absorber, connected in series with the second energy absorber comprising a viscous fluid damper. The energy absorption means is, as noted above, connected to the object to be shock isolated, through the engagement means, and to the enclosure comprising the supporting structural environment.

The return means comprises a return spring means connected in parallel to the energy absorption means and between the object to be shock isolated and the enclosure.

In such a passive shock isolation arrangement, for shocks at the enclosure resulting in relative movement between the object and the enclosure at comparatively low velocities, the constant force energy absorber is locked and acts as a rigid member and absorbs no energy. For this condition, the viscous fluid damper absorbs energy and for these comparatively low relative velocities acts as a very flexible member. However, when the relative velocity exceeds a preselected relative velocity the viscous fluid damper continues to absorb energy at a constant force for all relative velocities greater than the preselected relative velocity since the constant force energy absorber is selected to commence operating at the force level associated with the preselected relative velocity. For shocks at the enclosure resulting in relative velocities substantially greater than the preselected relative velocity, which is the damper velocity corresponding to the initiating force for operation of the constant force energy absorber, most of the energy is absorbed by the constant force energy absorber. After displacement from its base position to a first displaced position, for example, the restoring means comprising the return spring returns the object from the first displaced position to the base position at comparatively low velocities. At these low velocities, less than the preselected relative velocity once again the constant force energy absorber is locked and energy is absorbed during such return motion only by the viscous fluid damper.

In other embodiments of the invention, other arrangements of energy absorbers include a pair of opposed constant force energy absorbers with return means incorporated therein and are utilized for all of the energy absorption required during such shock isolation.

BRIEF DESCRIPTION OF THE DRAWINGS

The above and other embodiments of applicants' invention may be more fully understood from the following detailed description, taken together with the accompanying drawings, wherein similar reference characters refer to similar elements throughout and in which:

FIGS. 9 and 9a are graphical representations of characteristics of certain preferred embodiments of the invention;

FIG. 10 is a schematic representation of another preferred embodiment of the invention;

FIG. 11 illustrates the structure associated with another preferred embodiment of the invention;

FIG. 12 illustrates the structure associated with another preferred embodiment of the invention;

FIG. 12A is a sectional view taken along the line 12A-12A in FIG. 12;

FIG. 13 is a graphical representation of the characteristics of certain preferred embodiments of the invention;

FIG. 13A is a graphical representation of certain characteristics of a preferred embodiment of the present invention;

DESCRIPTION OF THE PREFERRED EMBODIMENTS

Figure 1:
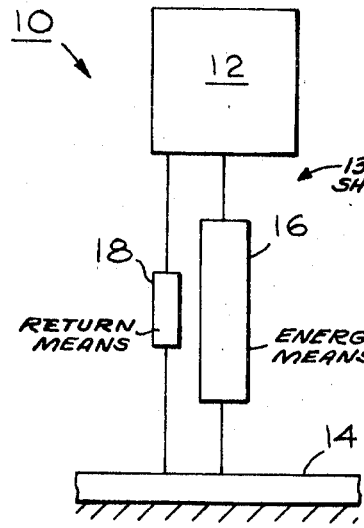
FIG. 1 is a schematic representation of a preferred embodiment of the invention.

As noted above, the shock isolation arrangement of the present invention generally provides a limitation on the maximum acceleration forces to which the object is subjected and also, simultaneously, provides a minimum necessary displacement or rattle space consistent with the maximum allowable force. The theory of providing such shock isolation arrangements is discussed in the publication "Optimal Shock Isolation Synthesis", by Theodore Liber, Air Force Weapons Laboratory, Technical Report No. AFWL-TR-65-82, Illinois Institute of Technology, Research Institute, Contract AF29(601)-6487, July 1966. Referring now to FIG. 1 there is shown, in schematic diagram form, the structure of one embodiment of the invention herein, generally designated 10. As shown, the shock isolation arrangement 10 comprises an object 12 that is to be shock isolated from its enclosure 14 comprising its structural supporting environment. That is, the object 12 is supported within the enclosure 14 for shock and/or vibration isolation.

A shock isolation means 13 comprising and energy absorption means 16 and a return means 18 is generally provided intermediate the object 12 and enclosure 14. The return means 18 is provided between the object 12 and enclosure 14 and in parallel with the energy absorption means 16. The combination of the energy absorption means 16 and a return means 18 comprises the shock isolation means 13.

In this embodiment of the invention, the degree of freedom for which shock isolation of the object 12 is to be provided is aligned with the direction indicated by the double ended arrow 22.

There is a maximum allowable displacement of the object 12 in either direction indicated by the arrow 22 relative to the enclosure 14 and this maximum allowable displacement is generally termed the rattle space.

The return means 18 provides a means for returning the object 12 from a displaced position relative to the enclosure 14 to its initial or base position.

Figure 2:
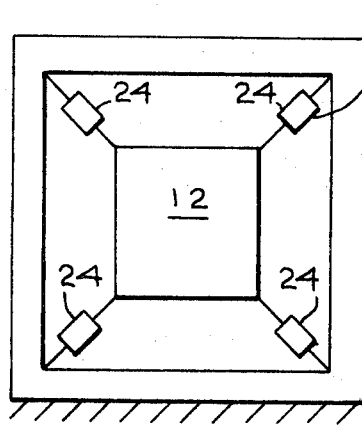
FIGS. 2 and 2a are schematic representations of the invention as utilized in a two-dimensional shock isolation arrangement.
Figure 3:
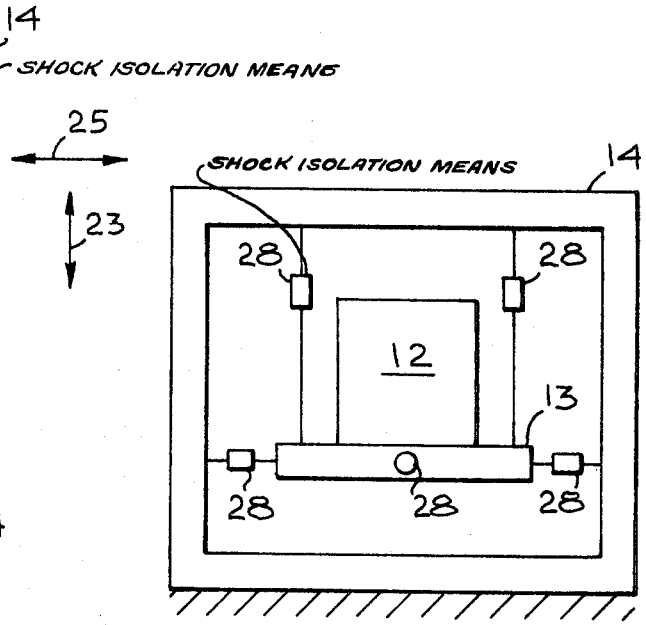
FIG. 3 is a schematic representation of the invention as utilized in a three-dimensional shock isolation arrangement.
Figure 2A:
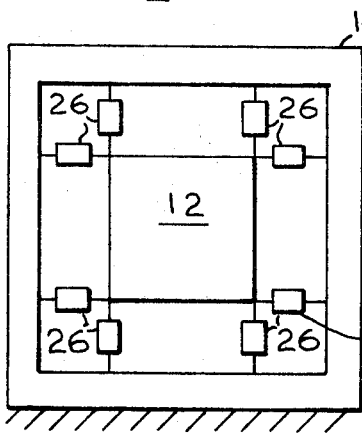

As noted above, the invention herein may also be utilized where several degrees of freedom are encountered. That is, the invention herein may be utilized in each degree of freedom to provide shock isolation in that particular degree of freedom. FIG. 2, 2a and 3 illustrate the utilization of the invention, in schematic diagram form, for more than one degree of freedom of an object 12 within an enclosure 14. FIG. 2 and 2a show a shock mounting of the object 12 within the enclosure 14 for two degrees of freedom aligned with double-ended arrows 23 and 25. As shown in FIG. 2, a shock isolation means 24 is connected diagonally and each corner of the object 12 an, as can be seen, for movement in either direction indicated by either of the arrows 23 or 25 the shock isolation means 24 can absorb the shock. Shock isolation means 24, of course, is similar to shock isolation means 30 incorporates the energy absorption means, such as energy absorption means 16 shown in FIG. 1, and the return means such as the return means 18. FIG. 2a shows a shock isolation means 26, which may be similar to shock isolation means 24 shown in FIG. 2 coupled between the object 12 and the enclosure 14 at the corners thereof but in orthogonal directions aligned with the degrees of freedom as indicated by the double-ended arrows 23 and 25.

In FIG. 3 there is shown the shock isolation of an object 12 in an enclosure 14 for shock isolation in all three orthogonal degrees of freedom as indicated by the isometric representation of the three orthogonal degrees of freedom showing the arrows 23, 25 and 27. In this embodiment the object to be shock isolated 12 is mounted on a platform 13, both of which are enclosed within the enclosure 14. The platform 13, in turn, is shock isolated by means of shock isolation means 28, which may be similar to the shock isolation means 24 and 26 described above, in all three directions.

Figure 4:
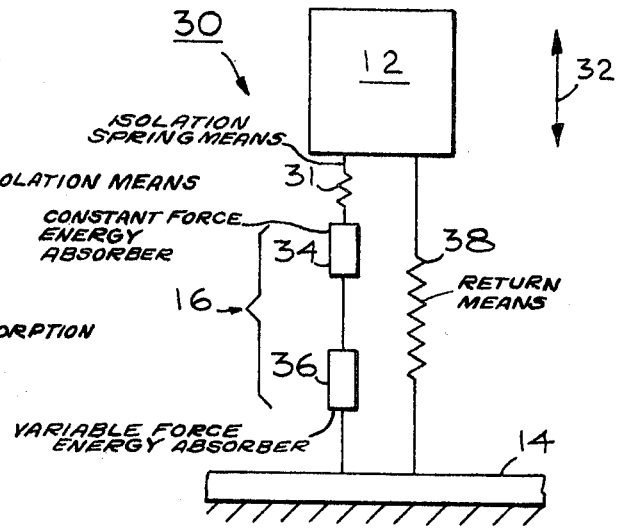
FIG. 4 is a schematic representation of another preferred embodiment of the invention.

Referring now to FIG. 4 there is illustrated, in schematic diagram form, one embodiment of a shock isolation arrangement shock isolation means generally designated 30 according to the principals of the invention herein for providing shock isolation in a single degree of freedom as indicated by the double-ended arrow 32 for an object 12 to be shock isolated from an enclosure 14 comprising the supporting structure thereof. In this embodiment the shock isolation means 30 of the invention comprises an energy absorption means 16 comprising a first energy absorber that may be a constant force energy absorber 34 connected in series with a second energy absorber 36 that, in this embodiment of the invention, may have a variable force energy absorbing characterisitc.

The shock isolation means 30 also comprises a return means 38 which, in this representation of the invention comprises a spring, is connected between the object 12 and the enclosure 14. Return means 38 returns the object 12 to its initial or base position after displacement thereof relative to the enclosure 14 in either direction indicated by the double-ended arrow 32.

The first or constant force energy absorber means 34 is double acting. That is, it absorbs energy during relative movement of the object 12 with respect to the enclosure 14 in either direction indicated by the double-ended arrow 32 and, in the preferred embodiments of the invention, this energy absorption schedule comprises a first predetermined energy absorption rate schedule for relative movement of the object 12 with respect to the enclosure 14 in both of the directions indicated by the arrow 32. During such energy absorbing movement the constant force energy absorber 34 absorbs energy at a substantially constant force independent of the relative velocity between the object 12 and the enclosure 14 for relative velocities therebetween greater than a preselected relative velocity.

The second or constant force energy absorber 36, on the other hand, in this embodiment of the invention, absorbs energy at a second predetermined energy absorption rate schedule that is dependant upon the relative velocity for relative velcocities between the object 12 and the enclosure 14 less than the preselected relative velocity in either direction indicated by the double-ended arrow 32. For relative velocities less than the preselected relative velocity the first or constant force energy absorber 34 is locked and does not absorb energy at all and, as noted above, during movement at relative velocities less than the preselected relative velocity all energy is absorbed by the second or variable force energy absorber 36.

The return spring 38 is selected so that the object 12 is returned from its displaced position after being subjected to a shock at a relative velocity that is less than the preselected relative velocity so that, in the preferred embodiment of the invention, energy is absorbed by the second or variable force energy absorber 36 during such return movement.

Isolation spring means 31 is operatively connected between the first or constant force energy absorber 34 and the object 12 to provide isolation of the object 12 with respect to the enclosure 14 from oscillatory high frequency impulses. It will be appreciated that isolation spring means 31 may not be included in the isolation arrangement 30 if it is not required by the anticipated shock inputs to the enclosure 14.

It will be appreciated that in the embodiment of the invention shown in FIG. 4 and as hereinafter set forth in some of the other embodiments, the energy absorption means 16 illustrated in FIG. 1 is represented by the first or constant force energy absorber 34 and second or variable force energy absorber 36.

FIG. 9 and FIG. 9a illustrate energy absorption charactersitics of a shock isolation arrangement such as that illustrated schematically in FIG. 4. As shown, FIG. 9 illustrates the energy absorption rate schedule behavior of the first energy absorber 34 on curve $a$, of the second energy absorber 36 on curve $b$ and of the total energy absorption means 16 on curve $s$. As can be seen, for relative velocities less than the preselected relative velocity, $V_c$, the energy absorption rate schedule, or the power, for the first energy absorber 34 is substantially zero since the force transmitted through the second energy absorber 36 is less than the force necessary to initiate operation of the first energy absorber 34. However, once the preselected relative velocity $V_c$ is reached energy absorber 34 commences to absorb energy at a substantially constant force which is equivalent to the force associated with the preselected relative velocity $V_c$ between the object 12 and the enclosure 14. The energy absorption rate schedule shown by curve $a$ is linearly dependent upon the relative velocity for relative velocities greater than $V_c$.

As shown by curve $b$, the energy absorption rate schedule, or power, associated with the second energy absorber 36, at relative velocities less than the preselected relative velocity $V_c$, is constantly increasing up to the energy absorption rate associated with the preselected relative velocity $V_c$. At the relative velocity $V_c$, as noted above, the first energy absorber 34 is activated and consequently, since the first energy absorber 34 absorbs energy at a constant force, the force does not increase. Therefore, for velocities greater than the relative velocity $V_c$, energy is absorbed by the second energy absorber 36 at a constant schedule independent of the relative velocity.

Curve $s$ illustrates the energy absorption rate schedule for the energy absorption means 16 which is comprised of the sum of of the energy absorption rates of the first energy absorber 34 and the second energy absorber 36. Since the first energy absorber 34 is locked for relative velocities between 0 and the preselected relative velocity $V_c$, the total energy absorption rate schedule for the energy absorption means 16 is the same as curve $b$ or the same as the energy absorption rate schedule for the second energy absorber 36. For relative velocities greater than the preselected relative velocity $V_c$, the total energy absorption rate schedule is the sum of the constant energy absorption rate schedule $b$ of the second energy absorber 36 and the linearly increasing energy absorption rate schedule of curve a for the first energy absorber 34.

In many embodiments of the invention, the return means 38 is selected so that the return of the object 12 with respect to the enclosure 14 from a first or second displace position (in either direction indicated by the arrow 32) is at a relative velocity less than the preselected relative velocity $V_c$ in order to allow utilization of, for example, comparatively small, lightweight and/or low cost springs. In such applications, of course, energy on the return is only absorbed by the second energy absorber 36. Thus, the third predetermined energy absorption rate schedule is the same as the second energy absorption rate schedule shown on curve $b$.

FIG. 9A shows the relationship between the force during energy absorption and the relative velocity between the object 12 and the enclosure 14. The first energy absorber 34 absorbs energy at a substantially constant force for relative velocities greater than $V_c$ (in either direction as indicated by the $+V_c$ and $-V_c$). Since the second energy absorber 36 absorbs energy at a constant force for velocities greater than $V_c$ also, the total energy absorption at velocities greater than $V_c$ is also at a constant force.

For relative velocites less than the preselected relative velocity $V_c$, the first energy absorber 34 is locked and hence force is transmitted directly therethrough and the force transmitted therethrough varies because of the variable force transmitted by the second energy absorber 36.

The return means 38 restores the object 12 preferably at velocities less than the preselected relative velocity $V_c$. Therefore, the second energy absorber 36 acts as a slip clutch to allow return of the object 12 without stroking the first energy absorber 34 when the return means 38 is selected to have a force less than that of the force associated with the second energy absorber 36 at the preselected relative velocity $V_c$. Thus, the shock isolation arrangement 30 shown in FIG. 4 restores the object after each displacement, has multiple impact capability and never leaves the object unprotected.

Figure 6:
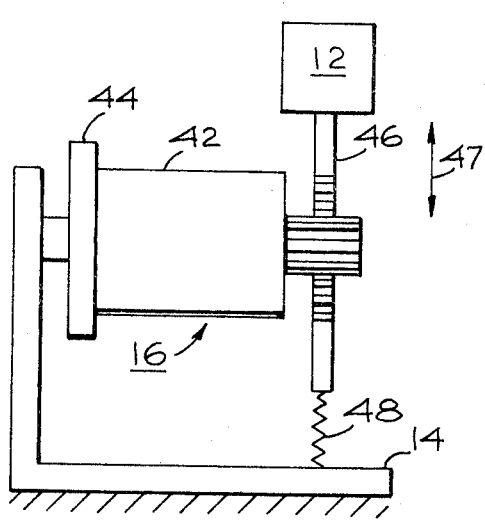
FIGS. 5 and 6 illustrate the structure associated with another preferred embodiment of the invention.
Figure 5:
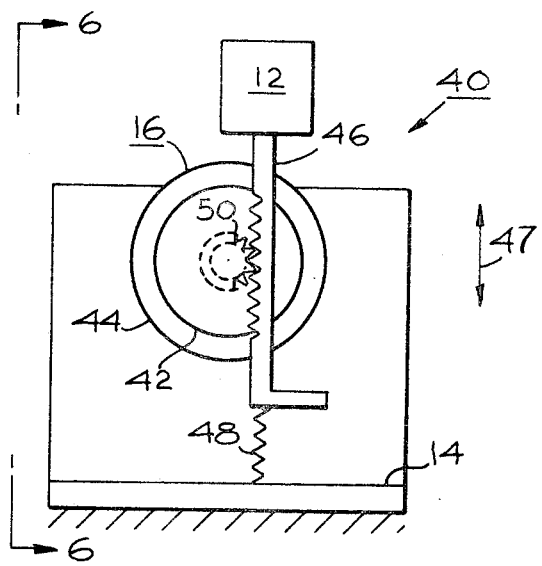

FIG. 5 and 6 illustrate the structure associated with a preferred embodiment of the invention illustrated schematically in FIG. 4 and having the energy absorption characteristics as indicated on FIG. 9 and FIG. 9A. As shown on FIG. 5 and 6 this embodiment of a shock isolation means, generally designated 40, isolates the object 12 from the supporting structure 14 comprises an energy absorption means comprising a first constant force energy absorber 42 and a second energy absorber 44. An engagement means 46 is coupled to the object to be isolated 12 and engages the first constant force energy absorber 42. The first constant force energy absorber 42 is, in this embodiment of the invention, a rotary energy absorber and as such may be a cyclic strain rotary energy absorber such as that illustrated in U.S. Pat. No. 3,435,919. Additionally, the energy absorber 42 may employ elastomers, friction surfaces or the like for absorbing energy at a substantially constant force for relative velocities between the object 12 and the enclosure 14 in either direction indicated by the arrow 47 for relative velocities above a preselected relative velocity. That is, the energy absorber 42 is double acting and has characteristics as shown in curve $a$ of FIG. 9.

The second energy absorber 44 is a rotary viscous damper such as that manufactured by Houdaille Industries, Inc., Buffalo, New York. Similarly, it may also be a rotary viscous damper such as that manufactured by Conair, Inc., Glendale, California. Viscous dampers in general, whether rotary or linear, have an energy absorption rate schedule similar to that shown in FIG. 9 as curve $b$ since, in general, they absorb energy by exerting shear forces on a viscous fluid and as such the forces increase with such relative velocity.

The characteristics of the first constant force energy absorber 42 are such that at the comparatively low relative velocities between the object 12 and the enclosure 14 in either direction indicated by the double-ended arrow 47 the first constant force energy absorber 42 is locked and rotates as a unit to drive the second energy absorber 44. It is only when the relative velocity exceeds the preselected relative velocity $V_c$ that energy absorption occurs in the first constant force energy absorber 42, when the force of the second energy absorber 44 reaches the stroking force of the first constant force energy absorber. After displacement of the object 12 with respect to the enclosure 14 in either direction indicated by the double-ended arrow 47 the return means 48 which is part of a shock isolation means 40 comprises a spring, moves the engagement means 46 which, as illustrated on FIG. 5 and 6 comprises a rack which in turn rotates the pinion 50 forming part of the first constant force energy absorber 42. Since the first constant force energy absorber 42 is locked under the comparatively low velocity less than $V_c$, provided by the return means 48, energy is absorbed during the return by the second energy absorber 44 in accordance with the energy absorption rate schedule indicated by the curve $b$ on FIG. 9.

Thus, energy absorption means 16 comprising the first constant force rotary energy absorber 42 and viscous drag rotary energy absorber 44 is always operatively connected to the object 12 through the engagement means 46 to absorb energy at all times. The object 12 is thus never left unguarded and regardless of the direction of movement in either direction indicated by the double-ended arrow 47 energy is absorbed by the energy absorbing means 16 to protect the object 12.

Figure 7:
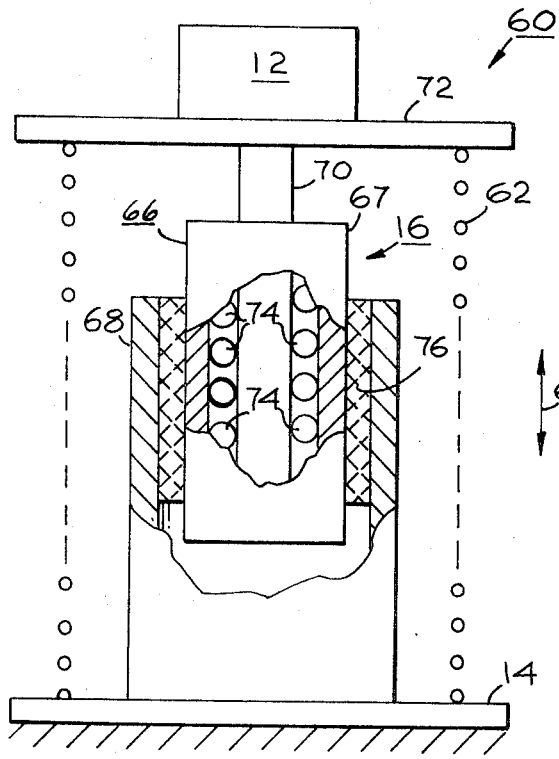
FIG. 7 illustrates the structure associated with another preferred embodiment of the invention.

FIG. 7 illustrates another embodiment of the invention herein wherein an object 12 to be isolated from an enclosure 14 in which it is supported is provided with a shock isolation means 60 comprising an energy absorption means 16 and a return means 62 which comprises a spring for restoring the object 12 to its base or initial position after displacement therefrom with respect to the enclosure 14 in either direction indicated by the double-ended arrow 64. In this embodiment of the invention the energy absorption means 16 has a first constant force absorber 66 coupled in series with a second energy absorber 68. In this embodiment of the invention the first constant force energy absorber 66 is a linear energy absorber engaging the engagement means 70 coupled to the platform 72 upon which the object 12 is coupled. The engagement means 70, in this embodiment of the invention, comprises a shaft that, for relative velocities of the object 12 greater than a preselected velocity rolls the energy absorbing elements 74 to absorb energy. The energy absorbing elements may be ductile metal rings, elastomeric rings, or the like. In general the structure thereof may be similar to the linear energy absorbers shown in U.S. Pat. No. 3,435,919.

The second energy absorber 68 is shown in schematic representation on FIG. 7 and is a linear viscous energy absorber and may be of the type fabricated by the above-mentioned Houdaille Industries, Inc. Such viscous dampers in linear applications shear a viscous fluid 76 to provide energy absorption. As such the energy absorption is in accordance with the predetermined energy absorption rate schedule that is substantially similar to the energy absorption rate schedule illustrated by curve $b$ in FIG. 9. Similarly, the energy absorption by the constant force energy absorber 66 is substantially similar to the energy absorption rate schedule shown by curve $a$ in FIG. 9.

In this embodiment of the invention, it will be appreciated, after each relative movement of the object 12 with respect to the enclosure 14 in which the preselected relative velocity $V_c$ is exceeded there is a displacement of the object 12 with respect to the first constant force energy absorber 66. Such relative movement of the object 12 with respect to the energy absorber 66 is not changed during the return under the influence of the return means 62 since, at the velocities imparted by the return means 62 only the viscous energy absorber 68 is activated. Therefore, in selecting a linear energy absorber consideration must be given to the total length of stroke that would be required for the anticipated shock characteristics and number of shocks to which the object 12 and enclosure 14 will be subjected.

It will be appreciated that instead of the energy absorbing element 74 being in the form of a toroid it could be in any other desired form for absorbing energy during stroking by the engagement means 70. Further, a pure friction engagement between the engagement means 70 and the inner wall of, for example, the outer drum 67 of the first energy absorber 66 could also provide substantially constant force energy absorption as desired. Additionally, the linear viscous energy absorber 68 could be replaced with a rotary energy absorber similar to rotary energy absorber 44 described above.

On the return of the object 12 from its displaced position to its base position under the influence of the return spring 62 it is preferred that the return velocity be kept comparatively low and therefore the first energy absorber 66 is locked and only the second energy absorber 68 is operative. In such an event there is, as noted above, a displacement of the first energy absorber 66 with respect to the second energy absorber 68.

It will be appreciated that the use of an oscillation isolation spring means such as the spring means 31 shown on FIG. 4 and connected in series with the energy absorbing means 16 between the object 12 and the enclosure 14 also tends to reduce the severity of the abrupt or step loading transmitted through the first energy absorber 34 during relative velocities less than the preselected relative velocity $V_c$.

Figure 8:
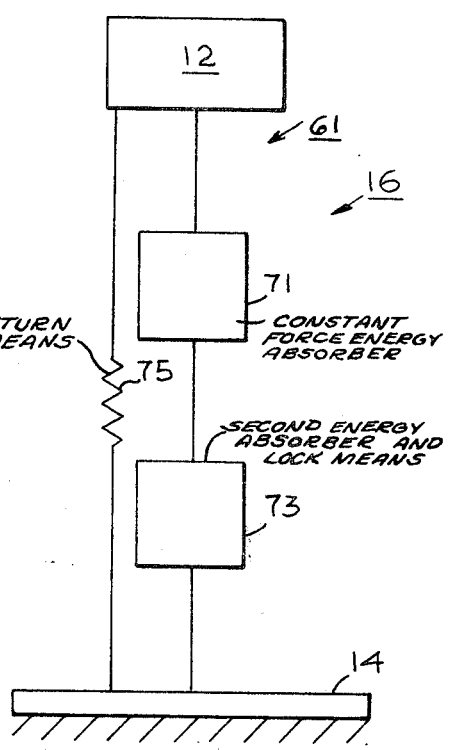
FIG. 8 is a schematic representation of another preferred embodiment of the invention.

FIG. 8 illustrates, in schematic diagram form, an embodiment of the invention herein wherein an object 12 is to be shock isolated with respect to an enclosure 14 a shock isolation means 61 comprising and is provided with an energy absorbing means 16 comprising, in this embodiment of the invention, a constant force energy absorber 71 connected in series with a second energy absorber and lock means 73 between the object 12 and enclosure 14. The constant force energy absorber 71 may, for example, be a rotary constant force energy absorber such as the constant force energy absorber 42 shown in FIGS. 5 and 6 or a linear constant force energy absorber such as the constant force energy absorber 66 shown in FIG. 7.

The second energy absorber and lock means 73 comprises an inertia lock means responsive to accelerations of the enclosure 14 and, at a preselected acceleration provides a locking force between the structure 14 and the constant force energy absorber 71.

The shock isolation means 60 also comprises a return means which may comprise a spring 75 and is coupled between the object 12 and enclosure 14 to provide return of the object 12 with respect to the enclosure 14 after each displacement.

The second energy absorber and lock 73 may incorporate friction engaging means for providing a preselected frictional force less than the locking force for conditions of acceleration of the base 14 less than the preselected acceleration and the inertia lock operates to provide a locking friction force for accelerations of the base 14 greater than the preselected acceleration. The second energy absorber and lock 73 may comprise a linear inertia lock or a rotary inertia lock, as desired for any particular application.

In the embodiments of the invention above described in FIGS. 5, 6 and 7, the second energy absorber was a viscous fluid energy absorber. In the embodiment of FIGS. 5 and 6 it was a rotary viscous fluid energy absorber and in the embodiment of FIG. 7 it was a linear viscous fluid energy absorber. The invention herein may also be utilized where the second energy absorber is not a viscous fluid energy absorber but, for example, may be a friction energy absorber with an inertia lock as shown schematically in FIG. 8.

In the embodiments of the invention so far described it will be appreciated that the two energy absorbers comprising the energy absorption means were connected in series and each was, in effect, double acting in that it absorbed energy, depending upon the relative velocity between the object to be isolated and the enclosure, for movement therebetween in either direction along the degree of freedom for which the object is to be protected. The invention herein may equally well be utilized wherein unidirectional energy absorbers are provided.

FIG. 10 illustrates an embodiment generally designated 160, in schematic diagram form, of the invention wherein an object 12 is to be shock isolated for relative movement with respect to the enclosure 14 along a degree of freedom aligned with the double-ended arrow 162 indicating the two directions of relative velocity therebetween. In this embodiment of the invention an engagement means 164 and an engagement means 166 are each coupled to the object 12 and engagement means 164 engages a unidirectional energy absorber 168 that is adapted to absorb energy for relative motion between the object 12 and the enclosure 14 in the direction indicated by the arrow 170 and to be substantially free running and free of energy absorption for relative motion in the direction indicated by the arrow 172. The engagement means 166 engages another unidirectional energy absorber 174 that is adapted to absorb energy during relative motion in the direction indicated by the arrow 172 and be substantially free of energy absorption for relative motion in the direction indicated by the arrow 170. In the embodiment of the invention utilizing this technique of two unidirectional energy absorbers 168 and 174 it is preferred that the energy absorbers be substantially constant force energy absorbers. Energy absorber 168 absorbs energy at a first predetermined energy absorption rate schedule for relative movement in the direction indicated by the arrow 170 and energy absorber 174 absorbs energy at a second predetermined rate schedule that is, in preferred embodiments, substantially the same as the first predetermined energy absorption rate schedule for relative motion in the direction indicated by the arrow 172.

Referring now to FIG. 11 there is shown the structure associated with one embodiment of the invention illustrated schematically in FIG. 10 and is generally designated 180. The embodiment 180 has the object 12 mounted for shock isolation in the direction indicated by the arrows 182 and 184. An engagement means 186 is coupled to the object 12 and engages a rack means 190 forming a part of a first substantially constant force energy absorber 188 that is supported on the structure 14 by support means 192. As shown the tab 186' drivingly engages the rack 190 during relative motion indicated by the arrow 182. For such relative motion in the direction indicated by the arrow 182 the first substantially constant force energy absorber 188 is rotated in the direction indicated by the arrow 194 and absorbs energy during such rotation. Thus first energy absorber 188 is a rotary energy absorber and has automatic return for return of the rack 190 to its base position under the influence of return spring 196. During such return motion the first substantially constant force energy absorber 188 is substantially free of energy absorption.

The energy absorber 188 is a resetable energy absorber and may be of the type described in U.S. Pat. No. 3,426,869. The techniques employed in the energy absorber 188 for absorbing energy may be any desired type of energy absorption that provides the energy absorption rate schedule desired.

A second substantially constant force energy absorber 198 which may be identical to the first substantially constant force energy absorber 188 is also mounted on the enclosure 14 by support means 192'. Tab means 186'' of the engagement means 186 is adapted to engage rack 200 for relative motion between the object 12 and the enclosure 14 in the direction indicated by the arrow 184 and in turn drives the second energy absorber 188 in the direction indicated by the arrow 202 for absorption of energy in that direction.

After displacement from the base position in the direction indicated by the arrow 184 return spring 204 returns the object 12 from its displaced position to its base position and the energy absorber 198 is substantially free of energy absorption during such movement. Thus, the shock isolation means 180 comprises both substantially constant force energy absorbers 188 and 198 as well as the return springs 196 and 204. As can be seen from the structure illustrated in FIG. 11 for the embodiment 180 for displacements of the object 12 relative to the enclosure 14 in the direction indicated by the arrow 182 only the first substantially constant force energy absorber 188 is engaged during the displacement and the return. Similarly, for displacement of the object 12 with respect to the enclosure 14 in the direction indicated by the arrow 184 only the second substantially constant force energy absorber 198 is engaged during such displacement and the return to the base position therefrom.

In this embodiment 180 of the invention the energy absorption characteristics are generally as illustrated in FIG. 13. For displacement of the object 12 relative to the enclosure 14, energy is absorbed at the forces indicated by either the first substantially constant force energy absorber 188 in accordance with the curve $c$, or the second substantially constant force energy absorber 198 in accordance with the curve $c'$. During return from displacement in the direction indicated by the arrow 182 the second substantially constant force energy absorber 188 is substantially free of energy absorption and the object 12 is returned by means of a linear return spring 196 as shown on curve $d$. If it were not for the return spring 196 the curve $c$ would be substantially horizontal and thus completely insensitive to displacement. However, since the return spring 196 is linear, curve $c$ is not quite constant and independant of displacement but does have a small component contributed by the linear return spring 196 that is dependent upon the relative displacement.

Similar curves $c'$ and $d'$ illustrate the energy absorption and return characteristics for the second substantially constant force energy absorber 198 for relative motion and return therefrom in the direction indicated by the arrow 184.

FIG. 13a illustrates the characteristics of the embodiment 180 when the return spring means 196 and 204 are constant force spring means. As such, the force at which energy is absorbed for displacements in either direction indicated by the arrows 182 and 184 is substantially constant for all displacements as shown by curves $r$ and $r'$. Similarly, for return, the force is also substantially constant as shown by curves $t$ and $t'$.

Diagrams similar to FIG. 13 and FIG. 13a could be drawn for embodiments incorporating hardening springs or softening springs for return springs 196 and 204.

Stops 210 and 212 are provided for positioning racks 190 and 200 and may include resilient pads 214 and 216 to absorb impact energy. Similarly, resilient pads 218 and 220 may be included on rack means 190 and rack means 200, respectively, to absorb impact energy during initial contact thereof with the engagement means 186.

FIG. 12 and 12a illustrate another embodiment of the invention herein of a shock isolation means generally designated 230 in which an object 12 is to be shock isolated from a supporting enclosure 14 in a single degree of freedom for motion in that degree of freedom in the directions indicated by the arrows 232 and 234. In this embodiment of the invention there are provided a pair of substantially constant force rotary energy absorbers 236 and 238. The first substantially constant force rotary energy absorber 236 is adapted to absorb energy for rotation in the direction indicated by the arrow 240 and to be substantially free running for rotation in the direction indicated by the arrow 242. Similarly, the second substantially constant force rotarty energy absorber 238 is adapted to absorb energy for rotation in the direction indicated by the arrow 242 and be substantially free running for rotation in the direction indicated by the arrow 240. Each of the substantially constant force rotary energy absorbers 236 and 238 may be energy absorbers of the type shown in U.S. Pat. No. 3,426,869 and be provided with slip clutches such as a form sprag clutch and a return spring built into the energy absorbing structure. As such, the shock isolation means 230 comprises the two substantially constant force rotary energy absorbers together with their built-in return means. An engagement means 244 comprises a rack for engaging pinion gear 246. A first rotary lost motion device 248 is intermediate the pinion gear 246 and the first substantially constant force rotary energy absorber 236, and a second rotary lost motion device 250 which may be similar to the first rotary lost motion device 248 is intermediate the first substantially constance force rotary energy absorber 236 and the enclosure 14. Stop means 252 having a resilient pad 254 thereon is used to limit the total relative displacement of the object 12 with respect to the enclosure 14 for relative motion therebetween in the direction indicated by the arrow 232.

While FIG. 12 shows the tabs on the lost motion device 248 and 250 being separated, for the condition of equilibrium with the object 12 at the base position with respect to the enclosure 14 the tabs are in engagement. When the object 12 moves in the direction indicated by the arrow 232 with respect to the enclosure 14, energy is immediately absorbed as the rack comprising the engagement means 244 rotates the first substantially constant force rotary pinion gear 246. The rotary energy absorber 236 then rotates two complete turns before the second lost motion device 250 is forced into engagement with the resilient pad 254 on the stop means 252. This limits the total excursion of the object 12 with respect to the enclosure 14 in the direction indicated by the arrow 232 to a value less than a predetermined rattle space.

The shaft 260 upon which the first substantially constant force rotary energy absorber 236, first lost motion device 248 and second lost motion device 250 are mounted, is fixed to the enclosure 14. The first substantially constant force rotary energy absorber 236 may be a rotary energy absorber of the type described in U.S. Pat. No. 3,426,869 equipped with a one-way clutch and an internal return spring. For example, in the embodiment shown in FIG. 12, the center shaft of the first substantially constant force rotary energy absorber 236 is the shaft 260 and is considered fixed. Between the shaft 260 and the inner drum of the first substantially force rotary energy absorber 236 is the one-way clutch that permits free rotation in the direction indicated by the arrow 234 but ensures energy absorbing rotation in the direction indicated by the arrow 232. Energy is absorbed due to relative motion between the inner drum and outer drum of the first substantially constant force rotary energy absorber 236 and, for example, ductile metal tubes may be positioned therebetween for such absorption of energy. When the lost motion device 248 engages the tab connected to the outer drum of the first substantially constant force rotary energy absorber 236, the one-way clutch prevents rotation of the inner drum and energy is absorbed by the cyclic straining of the energy absorbing tubes.

For relative motion of the object 12 with respect to the enclosure 14 in the direction indicated by the arrow 234, the second substantially constant force rotary second energy absorber 238 absorbs energy but allows, through a slip clutch, comparatively free motion to restore it to the base position in the direction indicated by the arrow 232. A first lost motion device 262, which is similar to the first lost motion device 248, is intermediate the pinion gear 246 and the second substantially constant force rotary second energy absorber 238. Similarly, a second lost motion device 264 is intermediate the second substantially constant force rotary second energy absorber 238 and a stop means 266 provided with a resilient pad 268 to absorb impact energy when the second substantially constant force rotary energy absorber 238 rotates the second lost motion device 264 into engagement. The mounting of the second substantially constant force rotary energy absorber 238, first and second lost motion devices 262 and 264 on the shaft 260 is substantially identical to the above-mentioned relationships therebetween for the first substantially constant force rotary energy absorber 236, first lost motion device 248 and second lost motion device 250. However, with the orientation of the tabs on the energy absorber and lost motion devices as shown for second substantially constant force rotary energy absorber 238 energy is absorbed during rotation in the direction of the arrow 242 which corresponds to motion of the object 12 with respect to the enclosure 14 in the direction indicated by the arrow 234. The number of lost motion devices on each side of the object 12 are the same so that automatic return by the spring loaded slip clutch in each of the substantially constant force rotary energy absorbing devices restores the entire assembly to the base position shown wherein it is free to absorb energy due to relative motion in either direction.

As can be seen, the embodiment shown in FIG. 12 protects the object 12 completely since at no time is there a possibility that any sudden change in relative motion direction or otherwise will result in unrestrained forces or accelerations on the object 12. The first energy absorption rate schedule provided by first substantially constant force rotary energy absorber 236 may be similar to the energy absorption by the curve $c$ shown in FIG. 13 and the return after displacement similar to that shown by the curve $d$ of FIG. 13. The spring, of course, providing the return is internal in the first and second substantially constant force rotary energy absorbers 236 and 238.

Similarly, the second predetermined energy absorption rate schedule provided by the second substantially constant force rotary energy absorber 238 is similar to the curve $c'$ shown on FIG. 13 which may be the same as the first predetermined energy absorption schedule shown by curve $c$. Similarly, the return spring follows the curve indicated by the curve $d'$ of FIG. 13.

In the above embodiments of the invention shown on FIGS. 11 and 12 the energy absorption means has been rotary energy absorbers. The invention herein may also be utilized with linear energy absorbers.

Figure 14:
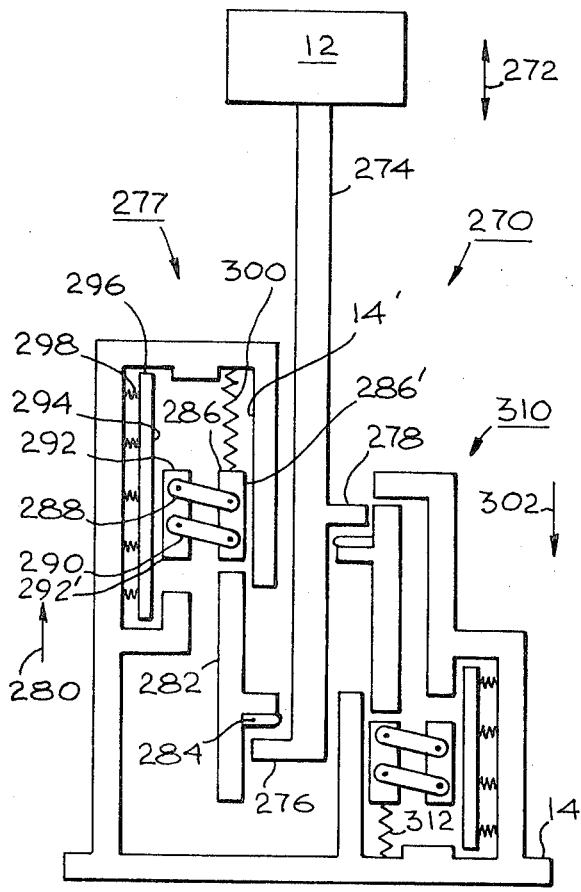
FIG. 14 illustrates the structure associated with another preferred embodiment of the invention.

FIG. 14 illustrates an embodiment of this invention of a shock isolation means generally designated 270 in which an object 12 is to be shock isolated for a single degree of freedom as indicated by the arrow 272 against relative movement in both directions thereof with respect to a supporting structural enclosure 14., and comprises a first linear energy absorber 277 and a second linear energy absorber 310. As shown on FIG. 14 an engagement means 274 has tabs 276 and 278 thereon. For relative movement of the object 12 with respect to the enclosure 14 in the direction indicated by the arrow 280 the tab 276 engages slide member 282 having a resilient pad 284 thereon for absorbing impact shock and a slide member 282 engages a first friction shoe 286 connected by parallel links 288 and 290 to a second friction shoe 292. Because of the parallel fourbar linkage as the slide member 282 moves in the direction of the arrow 280 the friction surfaces 286' and 292' of the members 286 and 292 respectively engage the friction surfaces 14' and 294 for frictional energy absorption. The greater the force exerted by the slide member 282 the greater will be the frictional force absorbed. The member 296 having the friction surface 294 is spring supported with respect to the enclosure 14 by a plurality of springs 298.

A return means such as return spring 300 returns the object 12 in the direction indicated by the arrow 302 after displacement in the direction indicated by the arrow 280. Thus, the first linear energy absorber 277 provides energy absorption at a first predetermined energy absorption rate schedule for motion of the object 12 with respect to the enclosure 14 in the direction indicated by the arrow 280 and is substantially free of energy absorption during return by the return spring means 300.

The second linear energy absorber 310 is substantially identical to the first linear energy absorber 277 except that it is positioned with respect to the engagement means 274 and the tab 278 thereon to be engaged by the tab 278 for movement of the object 12 with respect to the enclosure 14 in the direction indicated by the arrow 302 and to absorb energy during such motion. The return spring means 312 returns the object 12 from the displaced position with respect to the enclosure 14 to the base position as shown. The shock isolation means 270 thus comprises the two energy absorbers 277 and 310 together with the return springs 300 and 310.

Figure 15:
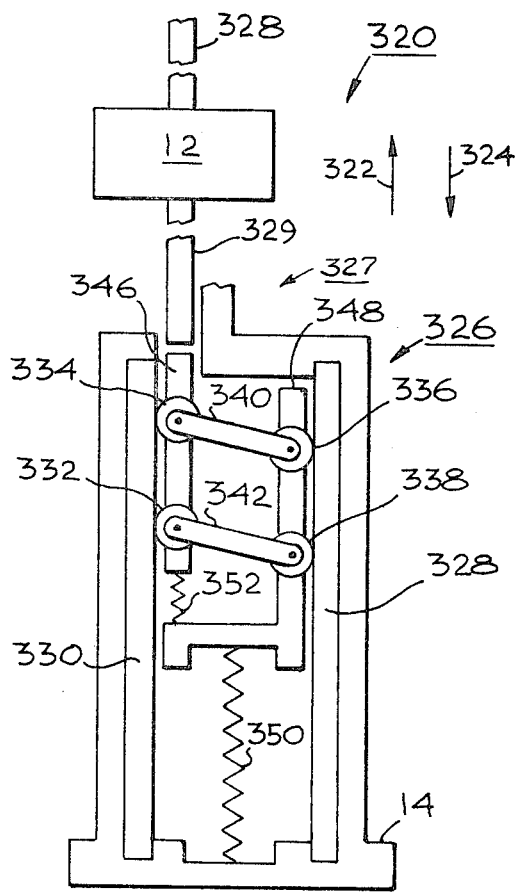
FIG. 15 illustrates the structure associated with another embodiment of the invention.

In FIG. 15 there is illustrated another embodiment of the invention of a shock isolation means generally designated 320 in which cyclic straining of elastomeric member is utilized to absorb energy.

As shown on FIG. 15 an object 12 is shock isolated within an enclosure 14 to absorb energy for relative movement therebetween in the directions indicated by the arrow 322 and 324. For clarity, only the energy absorber 326 for absorbing energy during motion in the direction indicated by the arrow 324 is illustrated. A similar energy absorber but oriented opposite to the energy absorber 326 may be coupled to a second engagement means 328 that is coupled to the object 12 to absorb energy for relative motion between the object 12 and the enclosure 14 during movement in the direction indicated by the arrow 322.

In this embodiment the energy absorber 326 has a pair of elastomeric pads 328 and 330. A plurality of solid rollers 332, 334, 336, 338 are connected by a fourbar parallel linkage comprised of links 340 and 342 and arms 346 and 348. When the object 12 moves in the direction of the arrow 324 with respect to the enclosure 14, the engagement means 329 engages the on 346 which, due to the fourbar linkage between the rollers 332, 334, 336 and 338, spreads arms 346 and 348 apart so that the rollers depress the resilient pads 330 and 328 as the rollers move downwardly in the direction indicated by the arrow 324. This absorbs energy as required. A return spring means 350 moves the fourbar linkage upwardly in the direction indicated by the arrow 322 and when the load from the engagement means 329 is removed disengagement spring 352 disengages the rollers 332, 334, 336 and 338 from energy absorbing engagement with the elastomeric pads 328 and 330 and allows the return spring 350 to return the fourbar linkage as well as the object 12 from the displaced position to the base position.

As noted above, a similar energy absorber would be provided connected to the engagement means 328 to absorb energy for a relative movement of the object 12 with respect to the enclosure 14 in the direction indicated by the arrow 322. The shock isolation means 320 thus comprises the energy absorber 326 and return spring 350 as well as another energy absorber and return means (not shown) for absorbing energy and return after relative movement in the direction indicated by the arrow 322.

Figure 16:
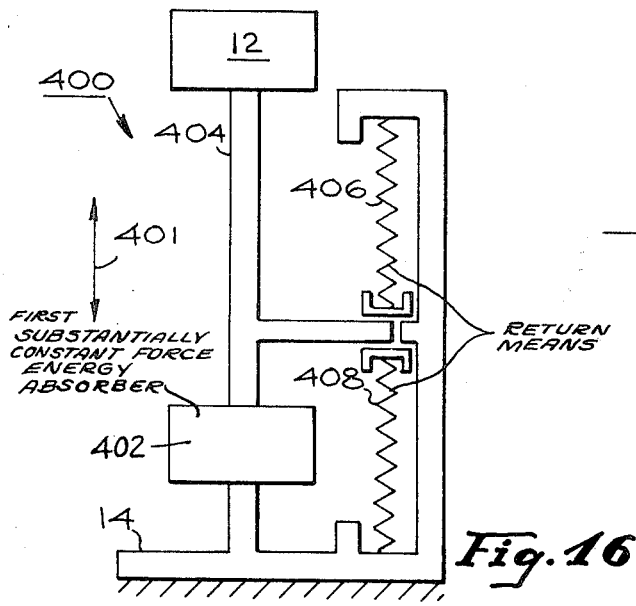
FIG. 16 illustrates in schematic diagram form another embodiment of the invention.

FIG. 16 illustrates, in schematic diagram form, another embodiment of the invention of a shock isolation means generally designated 400 wherein an object 12 is to be isolated from the supporting enclosure 14 for a single degree of freedom as indicated by the double-ended arrow 201.

Figure 17:
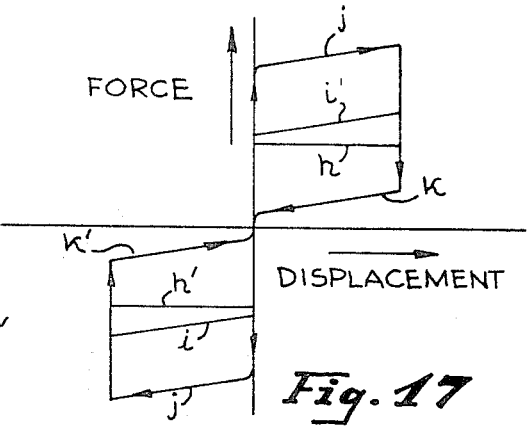
FIG. 17 is a graphical representation of the characteristics of the embodiment shown in FIG. 16.

As shown, the object 12 is connected to an engagement means 404 which operatively engages a first substantially constant force energy absorber 402. The first substantially constant force energy absorber 402 is double acting and may be a rotary energy absorber such as that illustrated at FIGS. 5, 6, 11 or 12, or a linear energy absorber such as that illustrated in FIGS. 7, 14 or 15. In this embodiment of the invention, the return means comprises a pair of opposed spring means 406 and 408. Thus, the shock isolation means 400 comprises the energy absorber 402 and the return spring means 406 and 408. The spring constants of the return springs 406 and 408 are chosen so that the force exerted thereby is slightly greater than the constant force energy absorption of the energy absorber 402. Therefore, for displacement of the object 12 with repsect to the base 14 in either direction indicated by the arrow 401, the force displacement relationship is as indicated in FIG. 17. Curves $h$ and $h'$ illustrate the constant force associated with the energy absorber 402 during displacement in either direction during which energy is absorbed thereby.

Curves $i$ and $i'$ illustrate the force-displacement behavior characteristics of the springs 406 and 408, respectively, for such relative displacement. It will be appreciated that the springs 406 and 408 are not energy absorbers but are merely energy storing devices. Therefore, the total force during displacement is the sum of the forces required by the constant force energy absorber 402 and the spring 406 or 408. This total force is indicated by curves $j$ and $j'$. As can be seen, they are not quite constant throughout the displacement range. This is the type of behavior that would be obtained when the springs 406 and 408 are linear springs. If substantially constant force springs were utilized then diagrams similar to that shown in FIG. 13A would exemplify the force-displacement behavior of embodiment 400 shown in FIG. 16.

Similar curves could be drawn for hardening or softening springs when utilized as the springs 406 and 408.

By selecting the spring constant so that the force is slightly greater than the constant force of energy absorber 402 during displacement, on return from displaced positions the energy absorber resists the motion and absorbs energy at the constant force as the spring returns the energy stored therein. Therefore, the net force restoring the object 12 with respect to the base 14 is the difference between the resisting force exerted by the constant force energy absorber 402 and the spring force of the springs 406 or 408, as shown by curves K and K' on FIG. 17.

As described above, the shock isolation means of the present invention comprises both an energy absorption, or energy absorbing, means and a return means. The energy absorption means may comprise one or more energy absorbers. The energy absorption means are operatively interconnected between the object to be shock isolated and the enclosure. An engagement means may form part of the structure for providing this operative connection. The return means may comprise one or more springs, or similar structure, and, in some embodiments, the return means is incorporated as part of the structure of the energy absorption means. The return means is also operatively interconnected between the object and the enclosure.

This concludes the description of the invention. From the above it is apparent that there has been described an improved shock isolation arrangement in which the maximum displacement from the base position is minimized while the maximum acceleration forces to which the shock isolated object is subjected is also minimized.

Those skilled in the art may find many variations and adaptations of the invention and the following claims are intended to cover all such variations and adaptations falling within the true scope and spirit of the invention herein.

What is claimed is new and desired to be secured by Letters Patent of the United States is:

1. In a shock isolation arrangement for providing shock isolation in a predetermined degree of freedom between an object to be shock isolated and the enclosure comprising the structural supporting environment therefor, the improvement comprising, in combination:
   an enclosure comprising a structural supporting environment;
   an object to be shock isolated positioned within said enclosure and having a preselected maximum rattle space between said object and said enclosure;
   engagement means connected to said objects;
   an energy absorbing means operatively connected between said enclosure and said engagement means for supporting said object in said enclosure, and positioned therebetween and having:
      first energy absorber comprising a substantially constant force energy absorber for absorbing energy at a first predetermined energy absorption rate schedule for the condition of relative movement between said object and said enclosure in a first predetermined direction in said predetermined degree of freedom from a base position to a first displaced position spaced from said base position and for the condition of relative movement between said object and said enclosure in a second predetermined direction opposite said first direction in said predetermined degree of freedom from said base position to a second displaced position spaced from said base position;
      a second energy absorber comprising a substantially variable force energy absorber for absorbing energy at a second predetermined energy absorption rate schedule different from said first predetermined energy absorption rate schedule for the condition of relative movement between said object and said enclosure in said first predetermined direction from said base position to said first displaced position spaced from said base position and from said first displaced position to said base position, and for the condition of relative movement between said object and said enclosure in said second predetermined direction opposite said first predetermined direction from said base position to said second displaced position and from said second displaced position to said base position;
   return means connected to said object for returning said object from said first displaced position and said second displaced position to said base position,
   and said energy absorbing means absorbing energy at said second predetermined energy absorption rate schedule of said second energy absorber of said energy absorbing means for said movement of said object relative to said enclosure by said return means, and said first energy absorber of said energy absorbing means free of energy absorption for said movement of said object relative to said enclosure by said return means.

2. The arrangement defined in claim 1 wherein said return means comprises:
   a spring means having a preselected spring constant for returning said object to said base position from said first displaced position and said second displaced position at velocities relative to said enclosure less than said preselected relative velocity.

3. The arrangement defined in claim 1 wherein:
   said first predetermined energy absorption rate schedule is substantially zero for relative velocities between said object and said enclosure less than a preselected velocity.

4. The arrangement defined in claim 3 wherein:
   said second predetermined energy absorption rate schedule is variable for the condition of said relative velocity between said object and said enclosure less than said preselected relative velocity, and substantially constant with respect to relative velocity for relative velocities greater than said preselected relative velocity.

5. The arrangement defined in claim 4 wherein:
   said first predetermined energy absorption rate schedule of said first energy absorber of said energy absorbing means is linearly dependant upon said relative velocities for the condition of said relative velocities greater than said predetermined relative velocity.

6. The arrangement defined in claim 5 wherein:
   said first energy absorber of said energy absorbing means absorbs energy at a substantially constant force independent of said relative velocities for the condition of said relative velocities greater than said preselected relative velocity.

7. The arrangement defined in claim 4 wherein:
   said first energy absorber, comprising said constant force energy absorber, for absorbing energy at a constant force at said first preselected energy absorption rate schedule for the condition of relative velocities greater than said preselected relative velocity in both said first and said second directions, and said first energy absorber substantially locked to transmit forces and be substantially free of energy absorption for the condition of said relative velocity between said object and said enclosure less than said preselected velocity in both said first and said second predetermined directions;
   said second energy absorber is operatively connected in series with said first energy absorber for absorbing energy at said second preselected energy absorption rate schedule; and
   said return means is connected in parallel with said energy absorbing means between said object and said enclosure.

8. The arrangement defined in claim 7 wherein:
   said first energy absorber is a linear energy absorber;

said second energy absorber is viscous fluid energy absorber.

9. The arrangement defined in claim 7 wherein:
said first energy absorber is a rotary energy absorber;
said second energy absorber is a viscous fluid energy absorber.

10. The arrangement defined in claim 7 wherein:
said return means moves said object with respect to said enclosure from said first and said second displaced positions to said base position at relative velocities less than said preselected velocity.

11. The arrangement defined in claim 7 and further comprising vibration isolation means comprising a vibration spring means operatively connected between said engagement means and said object for isolating said object from high frequency oscillatory forces.

12. The arrangement defined in claim 7 wherein:
said return means comprises a spring connected between said object and said enclosure in parallel with said energy absorbing means.

13. The arrangement defined in claim 12 wherein:
said spring is a linear spring.

14. The arrangement defined in claim 12 wherein:
said spring is a constant force spring.

15. In a shock isolation arrangement for providing shock isolation in a predetermined degree of freedom between an object to be shock isolated and the enclosure comprising a structural supporting environment therefor, the improvement comprising, in combination:
an enclosure comprising a structural supporting environment;
an object to be shock isolated positioned within said enclosure and having a preselected maximum rattle space between said object and said enclosure;
engagement means connected to said object;
a constant force energy absorbing means having a preselected initial operative force corresponding to a preselected acceleration of said enclosure and at relative velocities between said object and said enclosure greater than a preselected relative velocity, and said energy absorbing means free of energy absorption for the condition of forces thereon less than said preselected initial operative force, and operatively connected between said enclosure and said engagement means for supporting said object in said enclosure, and positioned therebetween for:
absorbing energy at a first predetermined energy absorption rate schedule for the condition of relative movement between said object and said enclosure in a first predetermined direction from a base position to a first displaced position spaced in said first predetermined direction from said base position and for the condition of relative movement between said object and said enclosure in a second predetermined direction opposite said first predetermined direction from said base position to a second displaced position spaced from said base position;
return means connected to said object for returning said object from said first and said second displaced positions to said base position at forces less than said initial operative force and relative velocities between said object and said enclosure less than said preselected relative velocity;
friction means coupled in series with said constant force energy absorber between said object and said enclosure frictionally engaging said engagement means with a predetermined friction force for frictional energy absorption for the condition of of relative velocity between said object and said enclosure less than said preselected relative velocity;
inertia lock means operatively connected to said friction means and said enclosure means and responsive to acceleration of said enclosure for applying a locking friction force between said friction means and said enclosure, for prevention of frictional energy absorption thereby for the condition of acceleration of said enclosure greater than said preselected acceleration and for releasing said locking friction force for the condition of acceleration of said enclosure less than said preselected acceleration.

16. The arrangement defined in claim 15 wherein:
said return means comprises a spring means and energy is absorbed during said return at said predetermined friction force between said friction means and said engagement means for the condition of relative movement of said object with respect to said enclosure from said first displaced position and said second displaced position to said base position; and
said predetermined friction force is less than said energy absorbing means initial operative force.

17. The arrangement defined in claim 15 wherein:
said constant force energy absorbing means comprises a first rotary constant force energy absorber; and
said inertia lock means comprises a linear inertial lock.

18. The arrangement defined in claim 15 wherein:
said constant force energy absorbing means comprises a first constant force rotary energy absorber; and
said inertial lock means comprises a rotary inertial lock.

19. The arrangement defined in claim 15 wherein:
said constant force energy absorbing means comprises a first constant force linear energy absorber; and
said inertial lock means comprises a linear inertial lock.

20. The arrangement defined in claim 15 wherein:
said constant force energy absorbing means comprises a first constant force linear energy absorber; and
said inertial lock means comprises a rotary inertial lock.

21. A shock isolation arrangement for providing shock isolation in a predetermined degree of freedome between an object to be shock isolated and an enclosoure comprising, in combination:
an enclosure;
an object to be shock isolated positioned within said enclosure and having a preselected maximum rattle space between said object and said enclosure;
an energy absorbing means operatively interconnected to said enclosure and said object for supporting said object in said enclosure and positioned therebetween for:
absorbing energy at a first predetermined energy absorption rate schedule for the condition of relative movement between said object and said enclosure in both a first predetermined direction and a second predetermined direction opposite said first predetermined direction from a base position to a first displaced position and a second displaced position, respectively, for relative forces between said object and said enclosure greater than a preselected force;

return means connected to said enclosure and operatively engaging said object for returning said object from said first and said second displaced positions to said base position, and said return means comprising a first spring resiliently resisting relative motion of said object with respect to said enclosure in said first direction and a second spring for resiliently resisting relative motion of said object with respect to said enclosure in said second direction, and said first spring and said second spring having a preselected spring constant for providing a return force on said engagement means greater than said preselected force.

22. In a shock isolation arrangement for providing shock isolation in a predetermined degree of freedom between an object to be shock isolated and an enclosure the improvement comprising, in combination:

constant force energy absorption means operatively interconnected between the object and the enclosure for absorbing energy at a substantially constant force during displacement of the object relative to the enclosure for at least the condition of relative velocity between the object and the enclosure greater than a preselected relative velocity, and said constant force substantially independent of relative velocity at least for relative velocities greater than said preselected relative velocity;

return means operatively engaging the object and the enclosure for returning the object to a base position after displacement therefrom relative to the enclosure;

means operatively connected between said constant force energy absorber and at least one of the object and the enclosure for maintaining said constant force energy absorber in energy absorbing relationship between the object and the enclosure.

23. The arrangement defined in claim 22 and further comprising:

vibration isolation means comprising a vibration spring means operatively connected between said constant force energy absorbing means and said object for isolating said object from high frequency oscillatory forces.

24. In a shock isolation arrangement for providing shock isolation in a predetermined degree of freedom between an object to be shock isolated and an enclosure the improvement comprising, in combination:

an enclosure;

an object to be shock isolated positioned within said enclosure and having a preselected maximum rattle space between said object and said enclosure;

an energy absorbing means operatively connected between said enclosure and said object for supporting said object in said enclosure, and positioned therebetween and having:

a first substantially constant force energy absorber operatively connected to said object for absorbing energy at a first predetermined energy absorption rate schedule for relative movement of said object from a base position to a first displaced position in a first direction is said predetermined degree of freedom;

a second substantially constant force energy absorber operatively connected to said object for absorbing energy at a second predetermined energy absorption rate schedule for relative movement of said object from said base position to a second displaced position in a second direction opposite said first direction in said predetermined degree of freedom;

return means operatively connected to said object and said enclosure for returning said object from said first displaced position and said second displaced position to said base position;

said first substantially constant force energy absorber and said second substantially constant force energy absorber substantially free of energy absorption for the condition of relative movement of said object with respect to said enclosure by said return means.

25. The arrangement defined in claim 24 wherein:

said first predetermined energy absorption rate schedule is substantially equal to said second predetermined energy absorption rate schedule.

26. The arrangement defined in claim 24 wherein:

said first predetermined energy absorption rate schedule is different from said second predetermined energy absorption rate schedule.

27. The arrangement defined in claim 24 wherein:

each of said first substantially constant force energy absorber and said second substantially constant force energy absorber comprise a rotary energy absorber; and said return means comprises a spring loaded clutch on each of said first and said second constant force energy absorbers.

28. The arrangement defined in claim 24 and further comprising:

first lost motion means intermediate said object and each of said first and said second constant force energy absorbing means, and second lost motion means intermediate each of said first and said second constant force energy absorbers and said enclosure.

29. The arrangement defined in claim 24 and further comprising:

impact energy absorption means connected to said object for absorbing impact energy at the onset of said relative movement between said object and said enclosure;

each of said first and said second energy absorbers absorbs energy at a constant force and said energy absorption rate schedule of said first substantially constant force energy absorber and said second substantially constant force energy absorber are equal, and said constant force is substantially independent of said relative velocities for at least the condition of said relative velocities substantially greater than a predetermined relative velocity.

30. The arrangement defined in claim 24 wherein:

each of said first and said second substantially constant force energy absorbers comprise linear energy absorbers;

said return means comprises a pair of similar spring means, each one of said pair of similar spring means having a predetermined spring constant and one each operatively connected intermediate said enclosure and said first and said second constant force energy absorbers.

31. The arrangement defined in claim 24 wherein:

said first and said second substantially constant force energy absorbers each comprise:

shoe means operatively engaged by said engagement means;

friction means having friction surfaces;

coupling means for coupling said friction means to said enclosure, and said shoe means frictionally engaging said friction surface of said friction means for frictional energy absorption therebetween.

32. The arrangement defined in claim 31 wherein:

said shoe means further comprises:

a first shoe and a second shoe in parallel relationship;

a pair of parallel links pivotally connecting said first shoe and said second shoe to define a four bar parallel linkage therewith;

said friction means further comprising:

a first friction member having a first friction surface;

a second friction member having a second friction surface;

said coupling means further comprises:

a plurality of spring means for resiliently coupling said first friction member to said enclosure; and said second friction member is rigidly coupled to said enclosure.

33. The arrangement defined in claim 31 wherein:

said first and second substantially constant force energy absorber comprise:

a first pair of rigid roller means;

a second pair of rigid roller means, and said first pair and said second pair of rigid roller means coupled in four bar parallel linkage relationship;

a first elastomeric pad means coupled to said enclosure means;

a second elastomeric pad means coupled to said enclosure;

and said first pair of rollers engaging said first elastomeric pad for cyclic strain energy absorption by said first elastomeric pad; and said second pair of rollers engaging said second elastomeric pad for cyclic strain energy absorption.

* * * * *